(12) United States Patent
Nord et al.

(10) Patent No.: US 9,786,321 B2
(45) Date of Patent: Oct. 10, 2017

(54) ELECTRONIC DEVICE AND METHOD FOR CONTROLLING NAVIGATION IN A VIDEO

(71) Applicant: Sony Corporation, Tokyo (JP)

(72) Inventors: Lars Nord, Lund (SE); Hakan Jonsson, Hjarup (SE); Ola Thorn, Limhamn (SE); Par-Anders Aronsson, Malmo (SE)

(73) Assignee: Sony Mobile Communications Inc., Tokyo (JP)

( * ) Notice: Subject to any disclaimer, the term of this patent is extended or adjusted under 35 U.S.C. 154(b) by 124 days.

(21) Appl. No.: 14/411,023

(22) PCT Filed: May 7, 2014

(86) PCT No.: PCT/IB2014/061259
§ 371 (c)(1),
(2) Date: Dec. 23, 2014

(87) PCT Pub. No.: WO2015/170141
PCT Pub. Date: Nov. 12, 2015

(65) Prior Publication Data
US 2016/0275986 A1    Sep. 22, 2016

(51) Int. Cl.
*H04N 5/783* (2006.01)
*G11B 27/00* (2006.01)
(Continued)

(52) U.S. Cl.
CPC ........ *G11B 27/005* (2013.01); *G06F 3/04842* (2013.01); *G06F 3/04845* (2013.01);
(Continued)

(58) Field of Classification Search
CPC ........................... G11B 27/005; G06F 3/04842
(Continued)

(56) References Cited

U.S. PATENT DOCUMENTS

| 6,788,878 B1 | 9/2004 | Fujii et al. |
| 2010/0092037 A1* | 4/2010 | Peleg ............... G06F 17/3079 |
| | | 382/103 |
| 2012/0166950 A1* | 6/2012 | Frumar ............... G06F 3/04883 |
| | | 715/719 |

FOREIGN PATENT DOCUMENTS

| EP | 0758832 A2 | 2/1997 |
| EP | 0954168 A2 | 11/1999 |

(Continued)

OTHER PUBLICATIONS

Petrovic, Nemanja et al., "Adaptive Video Fast Forward," Multimedia Tools and Applications, Kluwer Academic Publishers, vol. 26, No. 3, (Aug. 2005), pp. 327-344.

(Continued)

*Primary Examiner* — Hung Dang
*Assistant Examiner* — Girumsew Wendmagegn
(74) *Attorney, Agent, or Firm* — Renner, Otto, Boisselle & Sklar, LLP (57) ABSTRACT

An electronic device comprises a display to output a video, a user interface for controlling a navigation in the video along a time axis, and a processing device. The processing device is configured, when operating in an operating mode in which an object shown in a plurality of frames of the video is selected by a user input, to determine a magnitude of a speed vector of the object, and to apply a time scaling factor which depends on the determined magnitude of the speed vector of the object to the navigation along the time axis.

20 Claims, 8 Drawing Sheets (51) Int. Cl.
  *G06F 3/0484*  (2013.01)
  *G06F 3/0488*  (2013.01)
  *G11B 27/34*  (2006.01)
  *H04N 21/472*  (2011.01)

(52) U.S. Cl.
  CPC ...... *G06F 3/04847* (2013.01); *G06F 3/04883* (2013.01); *G11B 27/34* (2013.01); *H04N 5/783* (2013.01); *H04N 21/47217* (2013.01)

(58) Field of Classification Search
  USPC .......................................................... 386/343
  See application file for complete search history.

(56) References Cited

FOREIGN PATENT DOCUMENTS

| | | |
|---|---|---|
| JP | H09147472 A | 6/1997 |
| WO | 2009055692 A2 | 4/2009 |
| WO | 2008093321 A1 | 8/2009 |

OTHER PUBLICATIONS

Haferlin, Benjamin et al., "Information-based Adaptive Fast-Forward for Visual Surveillance," Multimedia Tools and Applications, Kluwer Academic Publishers, vol. 55, No. 1, (Sep. 2010), pp. 127-150.

International Search Report and Written Opinion from corresponding International Application No. PCT/IB2014/061259, mailed on Sep. 22, 2014.

\* cited by examiner

ELECTRONIC DEVICE AND METHOD FOR CONTROLLING NAVIGATION IN A VIDEO

TECHNICAL FIELD

Embodiments of the invention relate to electronic devices which are capable of outputting a video and to methods of controlling navigation in a video. Embodiments of the invention relate in particular to electronic devices which comprise a user interface for controlling the navigation in the video, such as by skipping forward or rewinding in a video.

BACKGROUND ART

A variety of electronic devices nowadays are configured for outputting a video. Examples of such electronic devices include portable communication devices which may playback a video which is stored locally at the electronic device, a video which is generated by a computer instruction code stored locally at the electronic device, or a video which is retrieved over a wireless interface.

For enhanced control and user experience, a user interface may allow the user to navigate in the video along a time axis. The user interface may allow the user to skip forward or to rewind in the video by a time shift, for example. Various implementations of the user interface may be used for navigation in the video along the time axis. For illustration, a distance on an input interface or a distance detected by a gesture control input unit may be converted into a time shift by which the user skips forward or rewinds in the video or into a rate at which fast forward or fast backward operations are performed.

Such conventional approaches for controlling navigation in a video have certain shortcomings. For illustration, a user may be particularly interested in following the movement of a particular object in a video. Without any prior knowledge of the anticipated movement of the object in the video, the conventional approaches for navigation in the video may make it challenging to navigate in the video in a manner that is tailored to the movement of the specific object in which the user may be interested. For illustration, an input action in which the user slides along the display surface by a pre-defined distance, performs a gesture control which is recognized to have a pre-defined distance, or otherwise performs a navigation input action to navigate in the video, this navigation input action may cause the same skip in the video independently of whether the user is interested in tracking a slow object or a fast object in the video. Enhancing the control over navigation in videos would not only be of interest for improved user experience, but also aids the user in performing tasks such as tracking objects.

SUMMARY

There is a continued need in the art for an electronic device and for a method which address some of the above shortcomings. In particular, there is a continued need in the art for an electronic device and for a method which assist a user in navigating in a video.

According to embodiments, an electronic device for outputting a video allows a user to select an object shown in a plurality of frames of the video and adapts the navigation in the video along a time axis in dependence on a magnitude of a speed vector of the object. The same input action received at a user interface for navigating along the time axis has different results depending on the magnitude of a speed vector of the object.

In embodiments, an input action received at the user interface for navigating in the video may lead to different time shifts by which the playback is skipped forward or backward, for example, depending on the magnitude of the speed vector of the object.

In embodiments, a time scaling factor which is used to convert an input action received at the user interface into a time for navigating in the video, such as a time shift by which the playback is skipped forward or backward may be determined from the magnitude of the speed vector of the object.

In electronic devices and methods according to embodiments, the input interface for navigating in the video may be modified in accordance with the magnitude of the speed vector of the object. The time may be dynamically scaled in dependence on the magnitude of the speed vector.

By implementing a control over navigation in the video which depends on a magnitude of a speed vector of an object selected by the user, the electronic device assists the user in managing tasks such as monitoring an object or identifying relevant portions of a video, e.g. in video surveillance.

Because the control depends on the magnitude of the speed vector, the user does not need to have any knowledge on the movement path of an object and the direction of the speed vector to trigger the speed-dependent control of video navigation by selecting an object.

According to an embodiment, an electronic device is provided. The electronic device comprises a display configured to output a video. The electronic device comprises a user interface for controlling a navigation in the video along a time axis. The electronic device comprises a processing device coupled to the user interface and the display. The processing device is configured, when operating in an operating mode in which an object shown in a plurality of frames of the video is selected by a user input, to determine a magnitude of a speed vector of the object, and to apply a time scaling factor which depends on the determined magnitude of the speed vector of the object to the navigation along the time axis.

The processing device may be configured to adjust positions or lengths of markings on the user interface in accordance with the time scaling factor, to thereby apply the time scaling factor to the navigation along the time axis. Alternatively or additionally, the processing device may be configured to multiply a magnitude of a user input action received at the user interface by the time scaling factor, to thereby apply the time scaling factor to the navigation along the time axis. For illustration, a time shift by which the video playback is skipped forward or backward by an input action may be determined by multiplying the magnitude of the input action by the time scaling factor. Alternatively or additionally, the processing device may be configured to select one of several functions or one of several look-up tables which respectively define the response to an input action received at the user interface, with the function or look-up table being selected as a function of the determined magnitude of the speed vector.

The processing device may be configured to determine a magnitude of an input action received at the user interface. The processing device may be configured to compute a time shift along the time axis in response to the input action as a product of the magnitude of the input action and the time scaling factor.

The magnitude of the input action may be a distance detected by the user interface. The magnitude of the input action may be distance by which an input instrument, e.g. a finger or stylus, slides on a touch-sensitive display or moves along a proximity-sensitive display. The magnitude of the input action may be a detected by a gesture input interface of the electronic device.

The magnitude of the input action may be a speed by which the input instrument slides on the touch-sensitive display or moves along the proximity-sensitive display.

The user interface may comprise a linear slider representing the time axis scaled by the time scaling factor. The linear slider representing the time axis scaled by the time scaling factor may be displayed in addition to another linear slider which represents the time axis without any scaling by the time scaling factor. The electronic device may be response to an input action received at either one of the linear slider which is time-scaled in accordance with the magnitude of the speed vector of the object and the linear slider which is independent of the magnitude of the speed vector.

The processing device may be configured to select a frame of the video for starting or continuing a playback of the video as a function of the computed time shift. This allows the user to skip forward or rearward by the time shift in the video, in a manner which depends on the magnitude of the speed vector of the object.

The time scaling factor may be a monotonic function of the determined magnitude of the speed vector of the object. This allows the speed-dependent control over the navigation to be implemented in an intuitive way.

The time scaling factor may be a monotonic increasing function of the determined magnitude of the speed vector of the object. This allows the speed-dependent control over the navigation to be implemented in an intuitive way, such that larger time shifts can be attained by selecting a faster object, while a more fine-grained control can be attained by selecting a slower object in the video.

The time scaling factor may be a monotonic decreasing function of the determined magnitude of the speed vector of the object. This may be particularly suitable in surveillance applications, for example, because the same input action will lead to a time shift along the time axis which is larger for an object which moves at a smaller speed. The time scaling factor may vary inversely with the magnitude of the object speed, so as to at least partially compensate the smaller distances traveled by a slower object per time when navigating in the video.

The time scaling factor may be independent of a direction of the speed vector of the object. This facilitates control even when the user does not have prior knowledge of the movement of the object.

The time scaling factor may be independent of a movement path along which the object moves in the video. This facilitates control even when the user does not have prior knowledge of the movement of the object.

The processing device may be configured to selectively apply the time scaling factor only if the object moves in the video.

The electronic device may support both the operating mode in which an object is selected by the user and another operating mode in which no object is selected by the user. The processing device may be configured, when operating in the other operating mode in which no object is selected, to process an input action received at the user interface without applying the time scaling factor.

The electronic device may be a portable terminal for communication with a cellular communication network. The electronic device may comprise a communication interface for wireless communication with a cellular communication network. The communication interface may be configured for communication over the EUTRA air interface.

The electronic device may be a hand-held device.

The processing device may be configured to control a retrieval of the video over the communication interface in dependence on the magnitude of the speed vector of the selected object. For illustration, for streaming of the video over the communication interface, the processing device may determine the time shift by which the video playback is skipped in the forward or backward direction in dependence on the magnitude of the speed vector, and the communication interface may receive frames over an air interface which correspond to a forward or backward skip by the time shift in the video. The processing device may be configured to transmit over the communication interface information which represents the time shift computed in response to an input action based on the magnitude of the speed vector.

The processing device may be configured to perform an image segmentation in frames of the video to identify the plurality of frames which show the object. The processing device may compute feature descriptors for the frames of the video to identify the plurality of frames which show the object. The feature descriptors may be selected from a group consisting of a Scale-Invariant Feature Transform (SIFT) descriptor, a Speeded Up Robust Features (SURF) descriptor, a Rotation Invariant Feature Transform (RIFT) descriptor, a Generalized Robust Invariant Feature (G-RIF) descriptor, a Principal Components Analysis SIFT (PCA-SIFT) descriptor or a Gradient Location and Orientation Histogram (GLOH) descriptor.

The plurality of frames which show the object do not need to be consecutive frames. The processing device may be configured to identify the object in a first frame and a second frame of the video, even when the object is not included in one or several frames in between the first frame and the second frame. This allows the time scaling to be performed even when the object is intermittently shown in non-consecutive portions of the video. The processing device may compute feature descriptors for the first frame and the second frame to detect that the selected object re-enters the video frames, while not being shown in each one of the video frames.

The processing device may be configured to support another operation mode in which no object is selected or in which a selected object does not move, in addition to the operation mode in which the selected object moves and speed-dependent time scaling is performed along the time axis.

The processing device may be configured to compute the speed vector from at least two frames of the plurality of frames. The speed vector may be computed as a time-averaged speed vector between the at least two frames. The processing device may be configured to compute the magnitude of the speed vector from the computed speed vector.

The processing device may be configured to compute the magnitude of the speed vector in a time-dependent manner. The navigation along the time axis may be scaled in a time-dependent manner, in accordance with the time-dependent variation of the magnitude of the speed vector of the selected object. The processing device may be configured to control the input interface in such a way that it indicates the time intervals in which the selected object moves.

A system according to an embodiment comprises the electronic device according to an embodiment and a wireless communication network configured to transfer the video to the electronic device.

A method of controlling navigation in a video along a time axis according to an embodiment comprises determining, by a processing device of an electronic device, whether an object shown in a plurality of frames of the video is selected by a user input. The method comprises determining, by the processing device, a magnitude of a speed vector of the object. The method comprises applying a time scaling factor which depends on the determined magnitude of the speed of the object for the navigation along the time axis.

Further features which may be implemented in the method according to exemplary embodiments and the effects respectively attained thereby correspond to the features of the electronic device according to an embodiment.

The method may be performed by the electronic device according to an embodiment.

The electronic device and method of various embodiments allow a magnitude of a speed vector of an object to be taken into account when navigating in a video. The user does not need to have prior knowledge about the direction in which an object moves to perform the navigation which takes the magnitude of the speed vector into account.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF DRAWINGS

The foregoing and additional features and advantages of the invention will become apparent from the following detailed description when read in conjunction with the accompanying drawings, in which like reference numerals refer to like elements.

DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. Functional blocks may be implemented in hardware, firmware, software or a combination thereof.

The features of the various embodiments may be combined with each other, unless specifically noted otherwise.

An electronic device and methods of navigating in a video will be explained with reference to the drawings. The electronic device is configured to output a video. As will be explained in more detail below, the electronic devices and methods of embodiments allow a navigation in the video to be adapted to a magnitude of a speed vector of an object. When the electronic device receives an input at a user interface for navigation in the video, the electronic device may respond differently depending on the magnitude of the speed vector of the object which was selected by the user. For illustration, the same input action received at the user interface may be translated to different time shifts by which a video playback is skipped forward or backward, depending on the magnitude of the speed vector at which the selected object moves.

Figure 1:
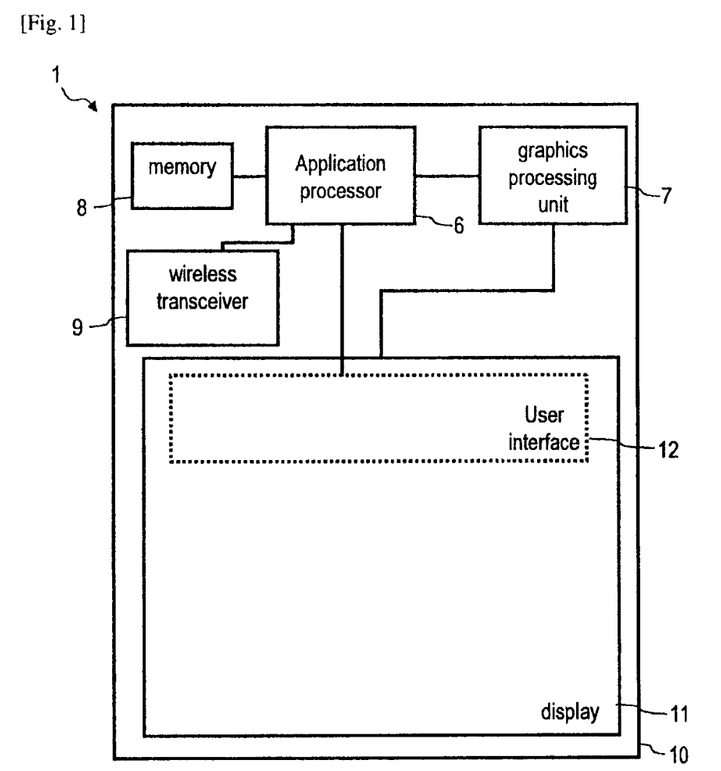
FIG. 1 is a schematic block diagram of an electronic device according to an embodiment.

FIG. 1 is a schematic block diagram representation of an electronic device 1 according to an embodiment. The electronic device 1 includes a display 11. The electronic device 1 comprises a processing device which is configured to control a playback of a video by the display 11. The processing device may comprise one or several integrated circuits, e.g. an application processor 6 and a graphics processing unit 7. The processing device may have any one of a variety of other configurations. For illustration, the processing device may comprise one or several controllers, one or several microcontrollers, or one or several application specific integrated circuits.

The electronic device 1 comprises a user interface 12 which allows a user to navigate along a time axis in the video. The term "navigation along the time axis" refers to controlling which section(s) of a video are to be played back, e.g. by specifying the playtime at which the playback of the video is to be started or continued.

The user interface 12 may comprise a touch sensor or a proximity sensor. The user interface 12 may be configured to detect a position or a range of positions on a sensor surface which were touched by an input instrument, e.g. a finger or stylus. The user interface 12 may be configured to detect a position or a range of positions at which the input instrument hovers above a sensor surface. The user interface 12 may be configured to support a gesture control of the navigation in the video. To this end, the user interface 12 may comprise a touch sensor, a proximity sensor and/or a camera to detect a gesture by which the user navigates in the video.

In addition to receiving input actions for navigation in the video, the user interface 12 may also allow a user to select an object which is shown in a frame of the video while the frame is being output at the display 11. The processing device may perform an image segmentation to determine which object was selected.

The processing device may be coupled to the user interface 12 to process an input action received at the user interface 12. The processing device may determine which navigation action is to be performed in response to an input action. For illustration, the processing device may determine by which time shift the playback is to be shifted forward or backward. The processing device may determine at which playtime the playback is to be continued or started. The processing device may convert the input action detected by the user interface 12 into a time shift, which may be an offset time at which the playback is continued or started or which may be the amount of time which is skipped in the playback. The processing device may apply a time scaling factor to determine which navigation action is performed in response to the detected input action.

As will be explained in more detail with reference to FIG. 2 to FIG. 13, the processing device may determine the time scaling factor in dependence on the magnitude of a speed vector at which the selected object moves. The processing device may determine the time scaling factor independently of a movement direction of the selected object.

The electronic device 1 is configured such that the operation of the user interface 12 for navigating in the video along the time axis is adjusted when an object is selected which moves in the video. The operation of the user interface 12 depends on the magnitude of the object speed, e.g. so as to provide a more rapid navigation along the time axis when a fast object is selected and/or to provide a slower navigation along the time axis when a slow object is selected. The electronic device 1 may be configured such that the same control operations may be used for navigation along the time axis in an operation mode in which a moving object is selected by the user and in another operation mode in which no moving object is selected by the user. However, the response to the same input action may be different depending on whether an object is selected, because the way in which input actions are converted into a navigation task varies with the magnitude of the speed vector.

The electronic device 1 may further comprise a memory 8 storing instruction code for the application processor 6. The memory 8 may store at least one function or at least one look-up table which defines the time scaling factor as a function of the magnitude of the movement speed.

The electronic device 1 may be a handheld terminal of a communication system. A wireless transceiver 9 may be coupled to the application processor 6. The wireless transceiver 9 may be configured for wireless communication under a wireless communication standard, such as GSM, 3GPP, UMTS, LTE, WLAN, or other communication standards. The application processor 6 may control the wireless transceiver 9 so as to enable wireless voice and/or data communication. The video may be received at the electronic device 1 over the wireless transceiver 9. At least in some scenarios, e.g. when the video is streamed, the application processor 6 may transmit a message over the wireless transceiver 9 to control the video streaming in accordance with the time scaling factor which was determined based on the magnitude of the speed vector of the selected object.

The various components of the electronic device 1, including the processing device, the display 11, and the user interface 12 may be integrated in a housing 10.

The operation of the electronic device 1 will be described in more detail with reference to FIGS. 2-13.

Figure 2:
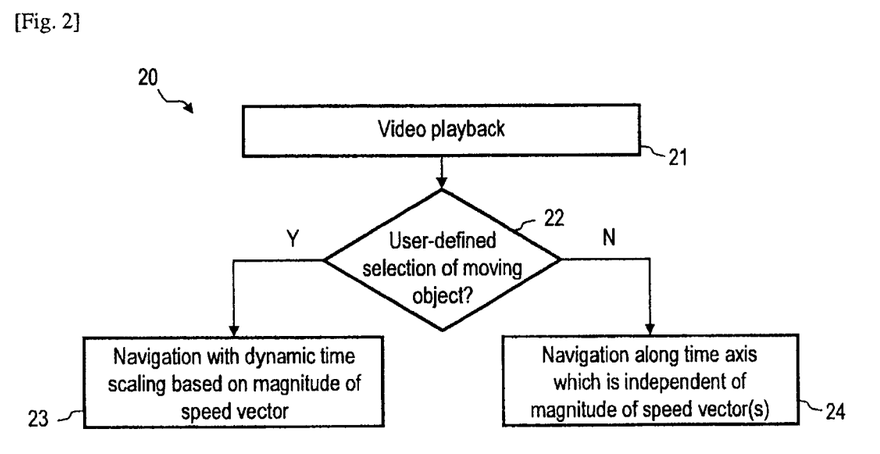
FIG. 2 is a flow chart of a method according to an embodiment.

FIG. 2 is a flow chart of a method 20 according to an embodiment. The method 20 may be performed by the electronic device 1.

At 21, a video playback is started. The video may be stored locally at the electronic device, may be retrieved over a wireless interface and/or may be computer generated graphics which result from the execution of instruction code.

At 22, the electronic device determines whether a user selects an object which is shown in a plurality of frames of the video and which moves in the video, i.e., which shifts relative to the boundaries of the image frame in a time-dependent manner.

At 23, if the user has selected an object which moves in the video, the navigation along the time axis may be scaled by a time scaling factor which depends on the magnitude of a speed vector of the selected object. Applying the time scaling factor may be implemented in various ways. In some implementations, the electronic device 1 may multiply a magnitude of an input action, e.g. a distance measured by the user interface 12, by the time scaling factor to determine a time shift for navigation in the video. The electronic device 1 may adjust a time scale on a time axis of the user interface 12, e.g. by dividing the time intervals of a conventional linear time axis by the time scaling factor. The electronic device 1 may alternatively or additionally select one of several pre-defined formulas or several pre-defined look-up tables which each define the navigation action which is performed for the respective input action. Each formula or look-up table may be assigned to a magnitude of the speed vector, with the appropriate formula or look-up table being selected based on the determined magnitude of the speed vector to thereby apply a time scaling factor for the navigation along the time axis.

At 24, if the user has not selected any object in the video or if the user has selected an object which does not move, the navigation along the time axis via the user interface 12 may be performed in a manner which is independent of the speeds at which objects move in the video.

In some embodiments, the user interface 12 may provide the navigation which is adapted to the magnitude of the speed vector of the moving object as one option in addition to a conventional navigation which does not involve any speed-dependent scaling of navigation along the time axis.

Figure 3:
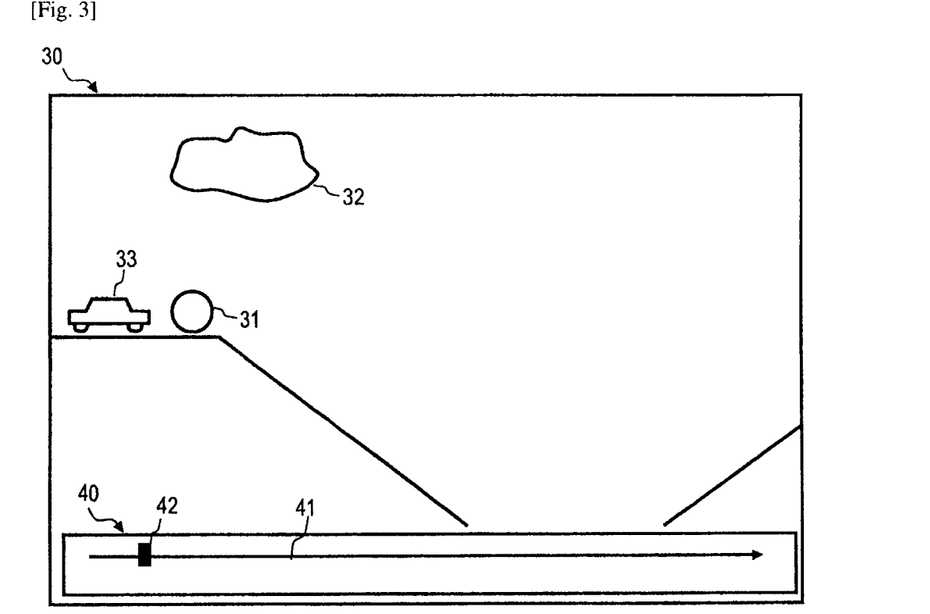
FIG. 3 shows a video frame and user interface of an electronic device according to an embodiment for explaining the operation of the electronic device.

FIG. 3 shows a frame 30 of a video. A time slider 40 for navigating in the video along the time axis may be provided. The time slider 40 may be responsive to input actions, such as touch input actions or proximity input actions. A control element 42 may be displaced along an axis 41 by the input action to control which section of a video is to be played. The time slider 40 may also be omitted and the control may be performed in that the user slides his finger across the display by a distance, with the distance encoding the time shift by which the playback is to skip forward or backward, for example.

The frame 30 shows several objects 31-33. A first object 31 may move at a speed greater than a second object 32. The electronic device 1 may be configured to allow the user to select any one of several moving objects 31, 32. When a moving object is selected, the response of the user interface 12 to an input action is modified in accordance with the magnitude of the speed of the moving object.

Figure 4:
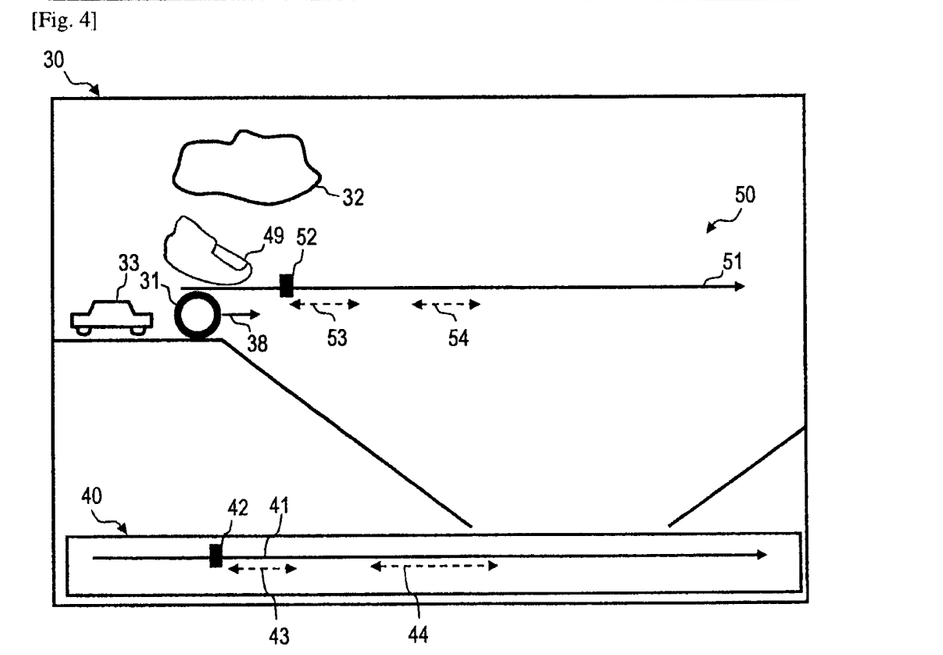
FIG. 4 shows the video frame and user interface of the electronic device when an object is selected for adapting the navigation along the time axis.

FIG. 4 shows the frame 30 when a first object 31 is selected by a user for controlling navigation in the video along the time axis. The first object 31 which is selected by the user may be highlighted under the control of the processing device. The electronic device 1 may be configured to allow the user to select the first object 31 by an input instrument 49, which may be a finger, a stylus, or another input instrument.

When the first object 31 is selected, the processing device may automatically determine the plurality of frames of the video in which the selected first object 31 is shown. The processing device may automatically determine a magnitude of a speed vector 38 of the selected first object 31 from at least two frames of the plurality of frames. Image segmentation may be performed to track the position and compute the speed vector of the first object 31. The processing device may compute feature descriptors for the frames of the video to track the selected first object 31 through several frames. The computed speed vector may be a time-averaged speed vector, which represents an averaged speed of the selected first object 31. The speed vector may be computed by the processing device in a time-resolved manner, such that time-dependent variations of the speed of the selected first object 31 can be taken into account.

In the operation mode in which an object is selected by the user, a speed-dependent time slider 50 may be provided in addition or alternatively to the time slider 40. The time slider 50 may allow the user to skip forward or backward along the time axis, e.g. by displacing a control element 52 along an axis 50. A time shift defined by a distance 53, 54 on the speed-dependent time slider 50 depends on the magnitude of the speed vector of the selected first object 31. The time shift defined by the distance 53, 54 may be greater than a time shift defined by the same distance on the conventional, not-scaled time slider 40 when the selected first object 31 has a magnitude of the speed vector 31 which is greater than a threshold speed. This allows the user to navigate faster through the video in an intuitive way, by selecting the first object 31 which has a magnitude of the speed vector 38 which is greater than a threshold speed.

The time scaling may be dynamically adjusted to the magnitude of the speed vector of the selected first object 31 when the magnitude of the speed vector varies as a function of time. For illustration, equal distances 53, 54 of an input action on the user interface 12 may correspond to different time shifts 43, 44 by which playback is skipped, for example, in accordance with a variation of the magnitude of the object speed.

Figure 5:
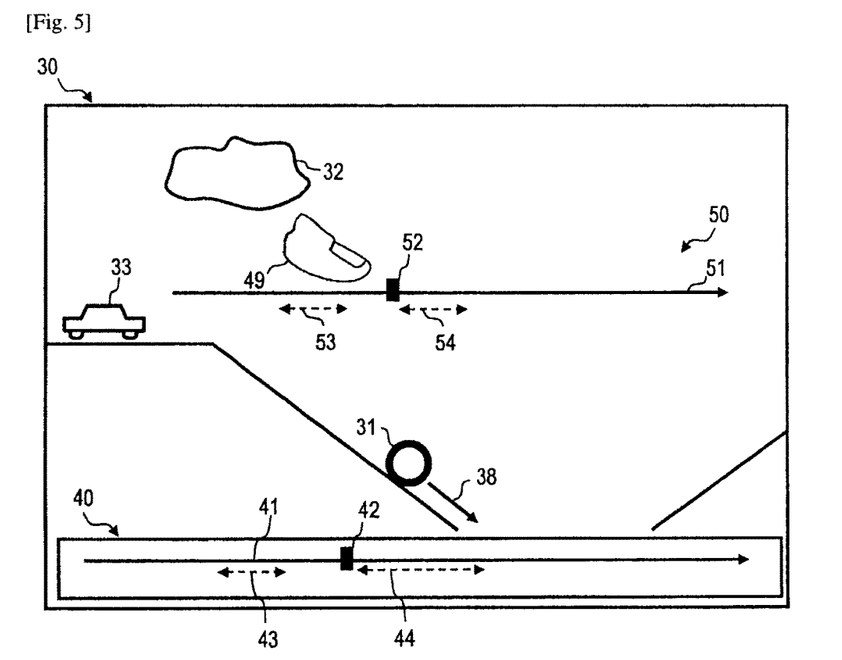
FIG. 5 shows another video frame and user interface of the electronic device when the object is selected for adapting the navigation along the time axis.

When the magnitude of the speed vector of the object 31 varies as a function of time, the same input action at the user interface 12 may result in different navigation actions due to the dynamic scaling of the navigation along the time axis. For illustration, when the magnitude of the speed vector 38 of the object 31 increases, as shown in FIG. 5, a distance 54 detected by the user interface 12 (which may be the distance by which the input instrument 49 slides on or along the display) may be translated into a time shift 44 which is greater than the time shift 43 computed from the same distance 53, but for a lower magnitude of the speed vector 38.

Figure 6:
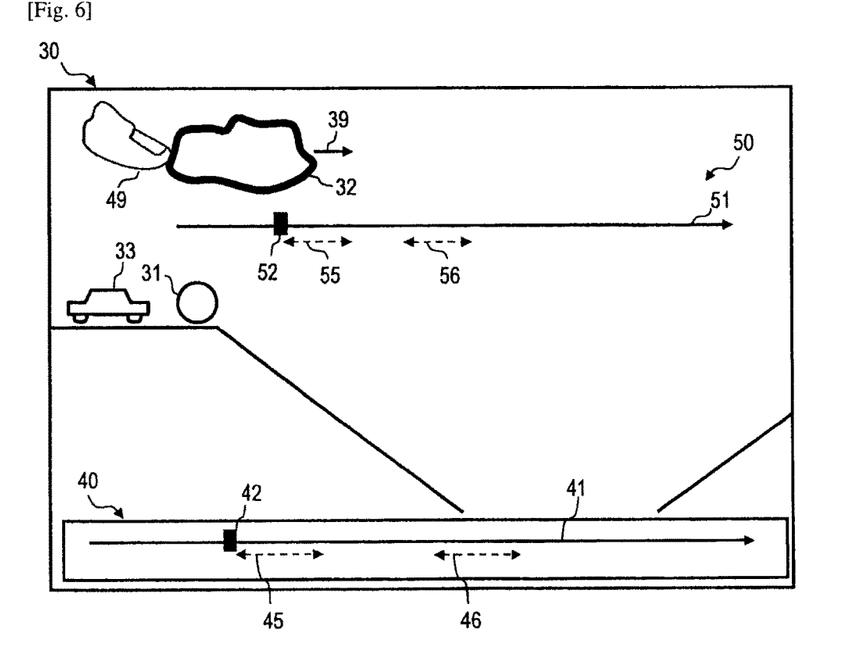
FIG. 6 shows the video frame and user interface of the electronic device when another object moving at a slower speed is selected for adapting the navigation along the time axis.

FIG. 6 shows the frame 30 when a second object 32 is selected by a user for controlling navigation in the video along the time axis. The second object 32 which is selected by the user may be highlighted under the control of the processing device. The electronic device 1 may be configured to allow the user to select the second object 32 by an input instrument 49, which may be a finger, a stylus, or another input instrument.

The second object 32 may move with a speed 39 in the video. The magnitude of the speed vector 39 determines the responsiveness of the user interface 12 for navigation in the video. When the second object 32 is selected, which has a magnitude of the speed vector 39 which is less than the magnitude of the speed vector 38 of the first object 31, an input action having a magnitude 55 may cause the playback to skip by a time shift 45, which is different from the time shift 43 which would result for the same input action when the first object 31 which moves at a faster speed is selected. For illustration, the input action having the magnitude 55 may cause the playback to skip by a time shift 45 which is greater than the time shift 43 which would result for the same input action when the first object 31 which moves at a faster speed is selected. Alternatively, the input action having the magnitude 55 may cause the playback to skip by a time shift 45 which is less than the time shift 43 which would result for the same input action when the first object 31 which moves at a faster speed is selected.

Figure 7:
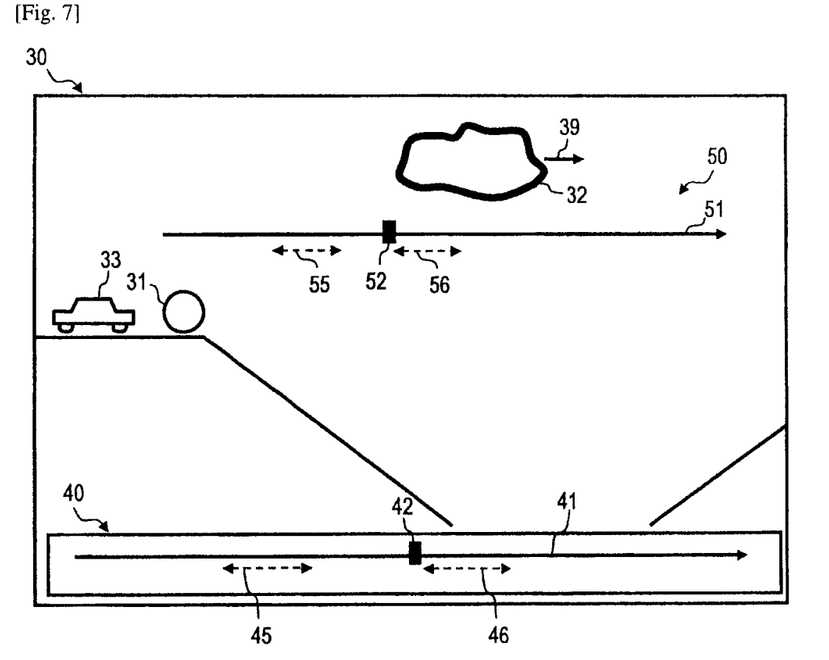
FIG. 7 shows another video frame and user interface of the electronic device when the other object moving at the slower speed is selected for adapting the navigation along the time axis.

FIG. 7 shows another frame 30 of the video when the second object 32 is selected. An input action having a magnitude 56, e.g. a displacement of the control element 52 along the axis 51 by the distance 56, is converted by the electronic device 1 into a time shift 46 which is less than the time shift which would result from a direct manipulation of the control element 42 of the time slider 40. The input action having a magnitude 56 may be converted into a time shift 46 which is less than the time shift 44 which would result for the same input action when the first object 31 which moves at a faster speed is selected.

In order to scale the time for navigation in a video in accordance with a magnitude of a speed vector of an object, the processing device of the electronic device may have various functional modules, as will be explained in more detail with reference to FIG. 8.

Figure 8:
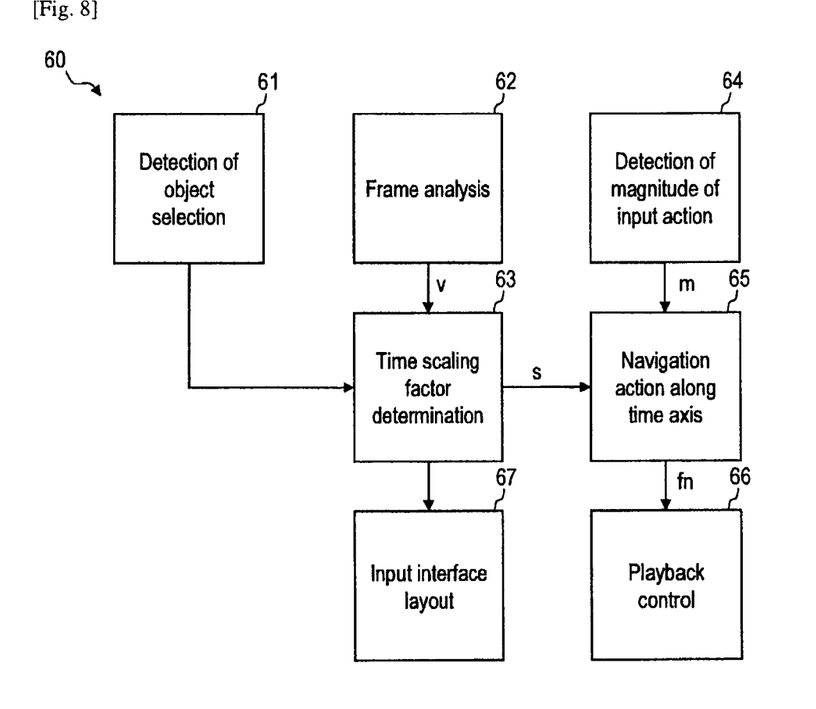
FIG. 8 is a block diagram of functional modules performed by a processing device of the electronic device according to an embodiment.

FIG. 8 is a functional block representation 60 which shows functional modules of a processing device. The functional modules may be implemented by hardware, by software, by firmware, or a combination thereof.

The processing device may have a module 61 for detecting a selection of an object shown in a frame of the video.

The processing device may have module 62 for analyzing at least two frames of the video to track a movement of the selected object. The module 62 may perform an image segmentation of the at least two frames to track the movement of the object. The module 62 may compute a feature descriptor or several feature descriptors for the at least two frames to track the movement of the object.

The processing device may have a module 63 for determining a time scaling factor for adjusting the navigation along the time axis in dependence on a magnitude of a speed vector of the object. The module 63 may compute the magnitude of the speed vector. The module 63 may compute the magnitude of a time-averaged speed vector, which may represent the average speed between the at least two frames in which the module 62 has tracked the movement. The module 63 may compute the magnitude of the speed vector in a time-resolved manner. The module 63 may determine the time scaling factor which defines whether the input interface becomes more sensitive or less sensitive for the navigation along the time axis as a function of the magnitude of the speed vector.

The processing device may have a module 64 for determining a magnitude of an input action received at the user interface for navigating in the video along the time axis.

The processing device may have a module 65 for determining a navigation action which is performed in response to the input action. The module 65 determines the navigation action based on the time scaling factor determined by the module 63 and the magnitude of the input action determined by the module 64.

The module 65 may determine the navigation action according to any one or any combination, of different ways. The module 65 may compute a product of the time scaling factor s and the magnitude m of the input action to determine a time shift along the time axis. The time shift may define by how much the playback is skipped along the time axis. The time shift may define a playtime at which the playback of the video is started or continued. A larger time scaling factor may correspond to a faster navigation along the time axis. The time scaling factor may be an increasing function of the magnitude of the speed vector, so that a larger magnitude of the speed vector corresponds to a faster navigation along the time axis.

The module 65 may select one of several functions or look-up tables as a function of the determined time scaling factor. Each one of the functions or look-up tables may define which navigation action is performed in dependence on the magnitude of the input action. The selection of one of the functions or look-up tables may be performed in accordance with the determined time scaling factor, to thereby define different behavior of the user interface for different object speeds of the selected object.

The module 65 may determine which frame of the video is to be output next. The processing device may have a playback control 66 which receives information fn on a frame which is to be output next. The frame is determined based on both the magnitude of the input action and the magnitude of the speed vector of the object, from which the time scaling factor depends.

The processing device may optionally have a module 67 for adapting a graphical layout of the user interface for navigation in the video to the determined object speed. For illustration, an axis of the user interface along which a control element can be displaced may be scaled in accordance with the time scaling factor. Time intervals in which the selected object moves in the object and is available for controlling the navigation in the video may be graphically marked on the user interface. The processing device may dynamically adapt the layout of the user interface as a function of the magnitude of the speed vector of the selected object, for example.

Figure 9:
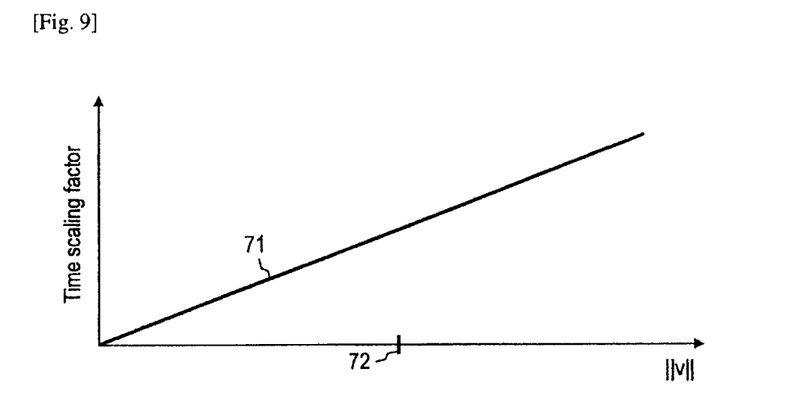
FIG. 9 is a graph representing a dependency of a time scaling factor from the magnitude of the speed vector when the object is selected by the user.
Figure 10:
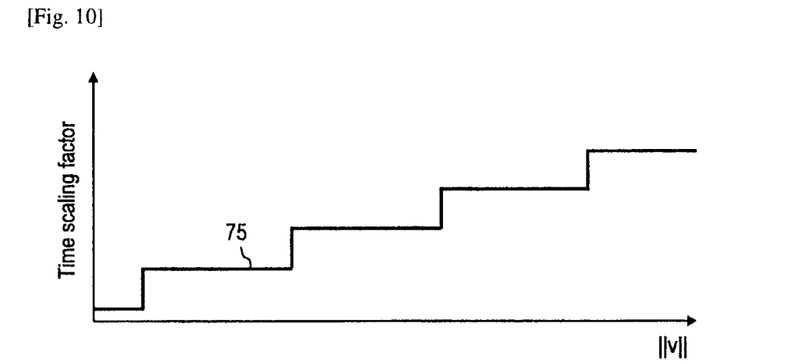
FIG. 10 is a graph representing another dependency of a time scaling factor from the magnitude of the speed vector when the object is selected by the user.

The time scaling factor may depend from the magnitude of the speed vector in any one of a variety of ways. The time scaling factor may be a monotonic increasing function of the magnitude of the speed vector, as illustrated in FIG. 9 and FIG. 10. The time scaling factor may be a linearly increasing function 71 of the magnitude of the speed vector, as shown in FIG. 9. When the magnitude of the speed vector is greater than a speed threshold 72, the time scaling factor may increase the speed of the navigation along the time axis compared to a case where no object is selected. For illustration, when the magnitude of the speed vector is greater than the speed threshold 72, an input action on the user interface may lead to a greater time shift than the same input action in the other operation mode in which no object is selected. When the magnitude of the speed vector is less than the speed threshold 72, the time scaling factor may reduce the speed of the navigation along the time axis compared to a case where no object is selected. For illustration, when the magnitude of the speed vector is less than the speed threshold 72, an input action on the user interface may lead to a smaller time shift than the same input action in the other operation mode in which no object is selected.

Various dependencies of the time scaling factor from the magnitude of the speed vector may be implemented. For illustration, as shown in FIG. 5, the time scaling factor may be a monotonic increasing step-wise function 7 of the magnitude of the speed vector.

In further embodiments, the time scaling factor may be a monotonic decreasing function of the magnitude of the speed vector. The time scaling factor may be a strictly monotonic decreasing function of the magnitude of the speed vector. In this case, a smaller magnitude of the speed vector of the selected object increases the speed of the navigation along the time axis. This may be useful to allow a user to more quickly skip over passages of the video in which the object moves only slowly. For a faster object, the navigation along the time axis becomes slower. This may be useful to allow a user to more closely monitor the movement of the object which moves fast.

Even when an object is selected in a video for controlling the navigation, the object does not need to be shown in each frame of the video.

Figure 11:
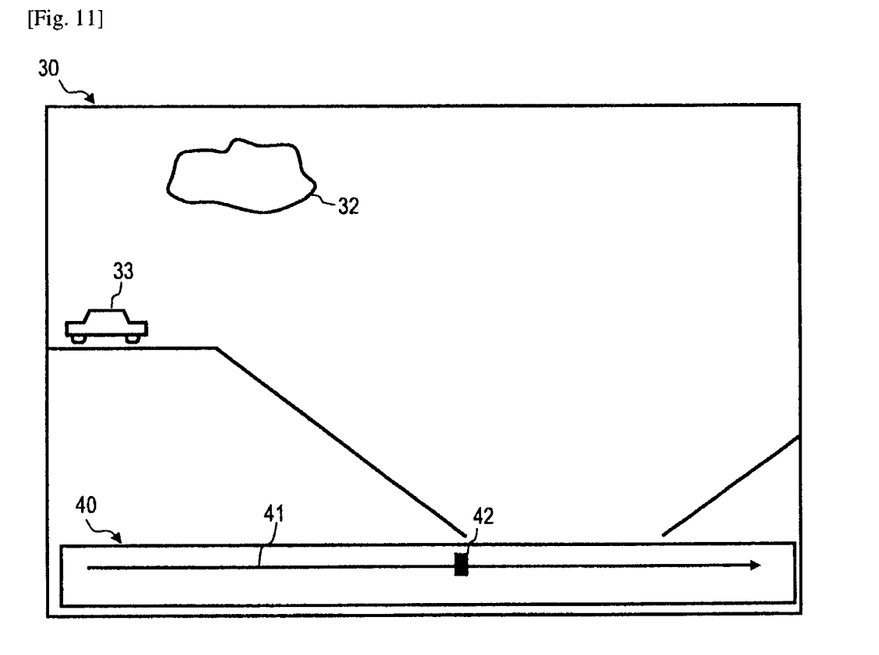
FIG. 11 shows the video frame and user interface of the electronic device when the selected object intermittently leaves the video frames.

FIG. 11 illustrates the frame 30 when the first object 31 selected for controlling the navigation along the time axis is not shown in the frame, e.g. because it temporarily leaves the video scene. The processing device of the electronic device may be configured to automatically detect when the object re-enters the scene shown by the video. Automatic object recognition, e.g. based on feature descriptors, may be used to detect that the object re-enters the scene. Alternatively or additionally, the user may be asked for a confirmation that speed-dependent navigation control is to be continued when the selected object is detected to re-enter the scene shown by the video.

The processing device of the electronic equipment may also automatically identify the time intervals in which the selected object is shown in the video. The user interface may be controlled to indicate in which time intervals the selected object is shown in the video and is available for navigation control along the time axis.

Figure 12:
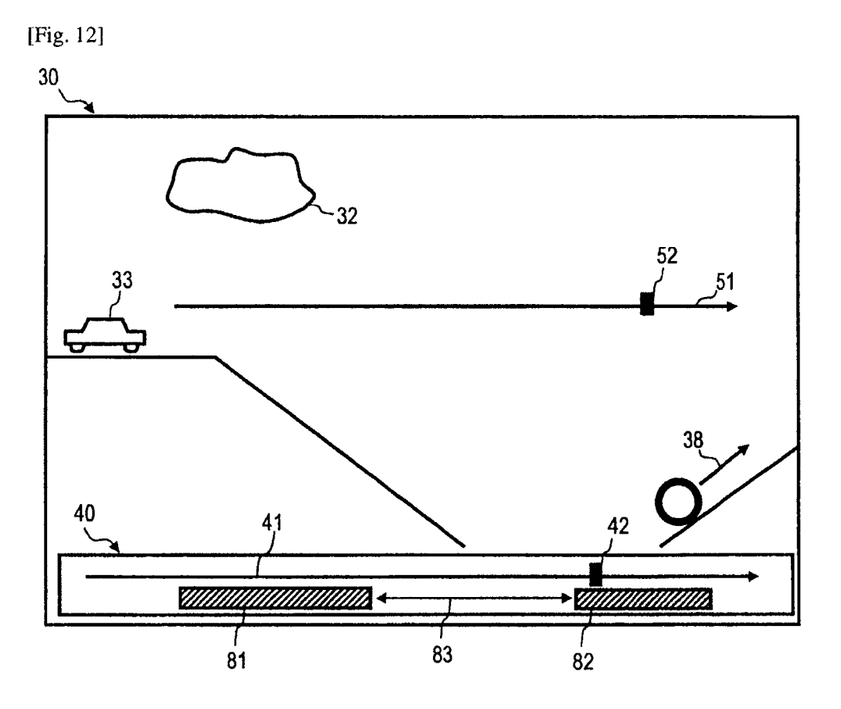
FIG. 12 shows another video frame and user interface of the electronic device when the selected object intermittently leaves the video frames.

FIG. 12 shows the frame 30 when the selected object 31 has re-entered the scene shown by the video. Time intervals 81, 82 in which the selected object 31 is shown in the video may be graphically marked on the user interface. The time intervals 81, 82 may be determining by the processing device by performing image analysis of frames of the video.

In an intermediate time interval 83 which is intermediate between the time intervals 81, 82, the selected object 31 may not be shown in the video. In the intermediate time interval 83, conventional control of the navigation along the time axis may be performed which does not depend on the magnitude of the speed vector of the selected object 31.

Figure 13:
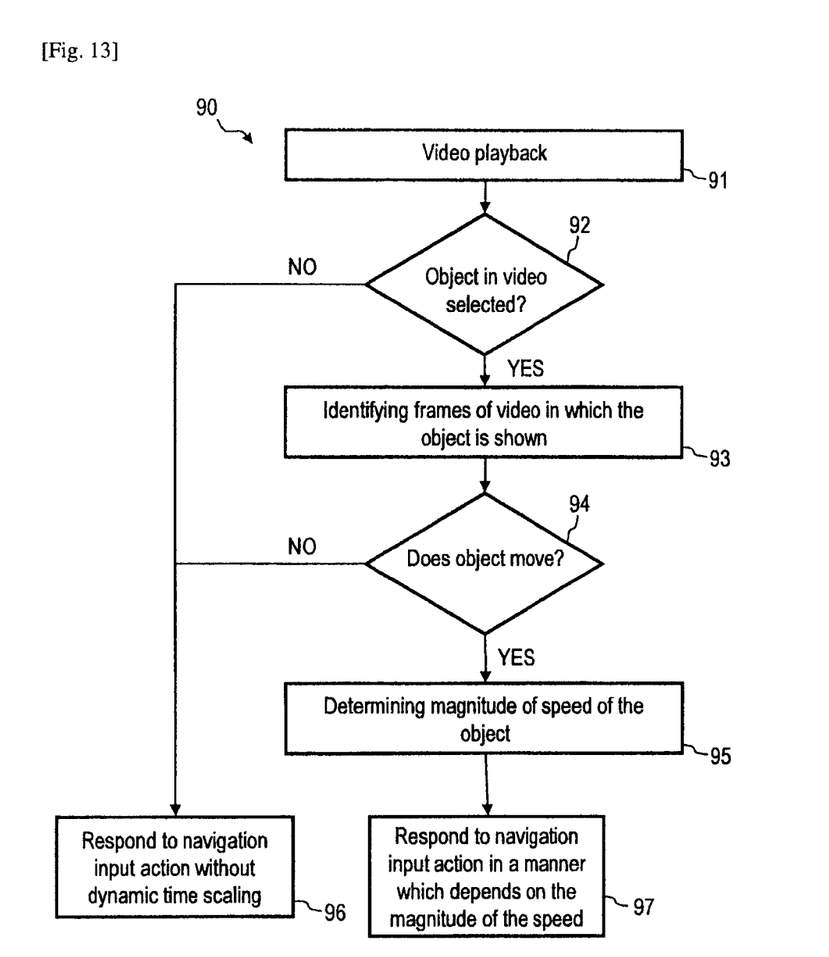
FIG. 13 is a flow chart of a method according to an embodiment.

FIG. 13 is a flow chart of a method 90 according to an embodiment. The method 90 may be performed by the electronic device 1 according to an embodiment.

At 91, a video playback is started. The video may be stored locally at the electronic device, may be retrieved over a wireless interface, or may be generated by executing computer-readable instruction code.

At 92, it is determined whether an object shown in the video is selected by a user. If no object is selected by the user, the navigation along the time axis may be performed at 96 in a conventional manner which does not depend on the magnitude of the speed vector of the object.

At 93, if it is determined that an object is selected by the user for controlling the navigation in the video, a plurality of frames which show the object are identified in the video.

At 94, it is determined whether the object moves in the video. If the object does not move in the video, the navigation along the time axis may be performed at 97 in a conventional manner which does not depend on the magnitude of the speed vector of the object.

At 95, if it is determined that the selected object moves in the video, a magnitude of the speed vector of the object may be determined. The magnitude may be the magnitude of a time-averaged speed vector.

At 97, the navigation along the time axis in the video is adapted in accordance with the determined magnitude of the speed vector of the object. The responsiveness of the input interface may be selectively increased or decreased, depending on the magnitude of the speed vector of the object, for example. The navigation along the time axis may become fast or slower, depending on the magnitude of the speed vector of the object.

In the electronic devices and methods according to any one of the various embodiments described herein, the speed vector of the selected object may be determined as the speed vector at which a center of the selected object moves in the video frames. The speed vector may be a two-dimensional speed vector which defines the movement of the selected object in the two-dimensional image plane of the display.

In embodiments, information on a movement of the object may be available not only in two, but also in three dimensions. For illustration, the display of the electronic device may be a stereoscopic display or an autostereoscopic display. Information on a movement of an object perpendicular to the display plane may be derived from the images which are output over the stereoscopic display or autostereoscopic display, e.g. by computing a disparity map. The speed vector may then be computed as a three-dimensional speed vector. Alternatively, image processing may be performed to determine whether the object shown in the video moves in a direction perpendicular to the image plane.

The user interface used for navigation along the time axis may have any one of a variety of implementations. For illustration, while time sliders have been illustrated in the context of some embodiments, alternative configurations may be used. The magnitude of the input action does not need to be a distance detected by touch or proximity sensing. For illustration, a force applied onto the display may be detected as the magnitude of the input action.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the appended claims.

What is claimed is:

1. An electronic device, comprising:
 a display configured to output a video;
 a user interface for controlling a navigation in the video along a time axis; and
 a processing device coupled to the user interface and the display, the processing device being configured, when operating in an operating mode in which an object shown in a plurality of frames of the video is selected by a user input, to
  determine a magnitude of a speed vector of the object, and
  in response to a user input action for navigation along the time axis, apply a time scaling factor which depends on the determined magnitude of the speed vector of the object to the navigation along the time axis.

2. The electronic device of claim 1,
wherein the processing device is configured to
 determine a magnitude of an input action received at the user interface, and
 compute a time shift along the time axis in response to the input action as a product of the magnitude of the input action and the time scaling factor.

3. The electronic device of claim 2,
wherein the magnitude of the input action is a distance detected by the user interface.

4. The electronic device of claim 2,
wherein the user interface comprises a linear slider representing the time axis scaled by the time scaling factor.

5. The electronic device of any one of claim 2,
wherein the processing device is configured to select a frame of the video for starting or continuing a playback of the video as a function of the computed time shift.

6. The electronic device of claim 1,
wherein the time scaling factor is a monotonic function of the determined magnitude of the speed vector of the object.

7. The electronic device of claim 6,
wherein the time scaling factor is a monotonic increasing function of the determined magnitude of the speed vector of the object.

8. The electronic device of claim 6,
wherein the time scaling factor is independent of a direction of the speed vector of the object.

9. The electronic device of claim 1,
wherein the processing device is configured to selectively apply the time scaling factor only if the object moves in the video.

10. The electronic device of claim 1,
wherein the processing device is configured, when operating in an operating mode in which no object is selected, to process an input action received at the user interface without applying the time scaling factor.

11. The electronic device of claim 1,
wherein the electronic device is a portable terminal for communication with a cellular communication network.

12. A method of controlling navigation in a video along a time axis, the method comprising:
 determining, by a processing device of an electronic device, whether an object shown in a plurality of frames of the video is selected by a user input,
 determining, by the processing device, a magnitude of a speed vector of the object, and
 in response to a user input action for navigation along the time axis, applying a time scaling factor which depends on the determined magnitude of the speed of the object for the navigation along the time axis.

13. The method of claim 12, further comprising:
 receiving, by a user interface of the electronic device, an input action;
 determining, by the processing device, a magnitude of the input action; and
 computing, by the processing device, a time shift along the time axis in response to the input action as a product of the magnitude of the input action and the time scaling factor.

14. The method of claim 13,
wherein the magnitude of the input action is a distance detected by the user interface.

15. The method of claim 13,
wherein the user interface comprises a linear slider representing the time axis scaled by the time scaling factor.

16. The method of claim 13,
wherein the processing device selects a frame of the video for starting or continuing a playback of the video as a function of the computed time shift.

17. The method of claim 12,
wherein the time scaling factor is a monotonic function of the determined magnitude of the speed vector of the object.

18. The method of claim 12,
wherein the time scaling factor is independent of a direction of the speed vector of the object.

19. The method of claim 12,
wherein the processing device selectively applies the time scaling factor only if the object moves in the video.

20. The method of claim 12,
wherein the processing device, when operating in an operating mode in which no object is selected, processes an input action received at a user interface of the electronic device without applying the time scaling factor.

\* \* \* \* \*